(12) United States Patent
Degoul et al.

(10) Patent No.: US 7,851,939 B2
(45) Date of Patent: Dec. 14, 2010

(54) ENERGY DISTRIBUTION BOX

(75) Inventors: Paul Degoul, Paris (FR); Jean-Francois M Larroux, Courbevoie (FR)

(73) Assignee: BWI Company Limited S.A., Luxembourg (LU)

( * ) Notice: Subject to any disclaimer, the term of this patent is extended or adjusted under 35 U.S.C. 154(b) by 699 days.

(21) Appl. No.: 11/820,843

(22) Filed: Jun. 20, 2007

(65) Prior Publication Data
US 2008/0006491 A1 Jan. 10, 2008

(30) Foreign Application Priority Data
Jun. 23, 2006 (EP) .................. 06291035

(51) Int. Cl.
*B60L 1/00* (2006.01)
(52) U.S. Cl. .................................... 307/10.1
(58) Field of Classification Search ............ 307/9.1, 307/10.1; 303/3, 15, 16, 17
See application file for complete search history.

(56) References Cited

U.S. PATENT DOCUMENTS 5,855,417 A * 1/1999 Johnston et al. ............. 303/3
7,102,416 B2 * 9/2006 Finney ..................... 327/434
7,235,897 B2 * 6/2007 Yokoyama et al. .......... 307/9.1
2002/0108463 A1 * 8/2002 Shaw et al. ................ 74/512

FOREIGN PATENT DOCUMENTS

FR 2 850 071 1/2003
FR 2850071 A1 * 7/2004

* cited by examiner

*Primary Examiner*—Jared J Fureman
*Assistant Examiner*—Daniel Cavallari
(74) *Attorney, Agent, or Firm*—Dickinson Wright PLLC

(57) ABSTRACT

An energy distribution box includes a connection line connected respectively by an input supply line to each of a first and second input and an output supply line to each of a plurality of outputs. A switching means is arranged respectively in each of the input and output supply lines for selectively and independently coupling each of the inputs and outputs with the connection line. Each of the output supply lines are disposed independent of each other and at least two pedal feel emulators are disposed separately on independent output supply lines for ensuring that in case of malfunction of one of the pedal feel emulators that at least one of the pedal feel emulators is supplied with electrical energy from the energy distribution box.

12 Claims, 6 Drawing Sheets

US 7,851,939 B2

ENERGY DISTRIBUTION BOX

TECHNICAL FIELD

The present invention has as its object an energy distribution box for an electrically controlled system of a vehicle and an energy supply architecture using the energy distribution box.

BACKGROUND OF THE INVENTION

The motor vehicle industry currently increasingly tends to use electrically controlled systems. An electrically controlled system includes electromechanical actuators which replace conventional mechanical actuators.

The reliability of electronic components being lesser than that of mechanical components, particular attention must be paid to malfunction management in electrically controlled systems, in particular for electrically controlled systems relating to the safety of the vehicle, for example braking, steering and suspension systems. The aim is to create malfunction-tolerant electrically controlled systems, i.e. systems the operation of which is assured even in case of malfunction of a part of the system.

Electrically controlled systems are supplied by an energy distribution box. In case of malfunction of the electrically controlled system (energy source, loom, distribution box, electrical loads), it is important that the energy distribution box continues to supply sufficient energy for the electrically controlled system to fulfil its function(s). The electrical supply architecture must therefore be malfunction-tolerant.

The document FR 2 850 071 describes an energy distribution box for an electromechanical braking system of a motor vehicle. The energy distribution box includes a set of inputs, intended to be respectively connected to sources supplying the box with electrical energy, and a set of outputs, intended to be connected to electrical loads of the braking system. Diagnostic means perform current measurements to monitor the proper operation of the supply sources and of the electrical loads. Switching means are interposed between the inputs and the outputs to permit configuration of the elements of the supply circuit of the outputs as a function of malfunctions detected in a supply network extending between the supply means and the electrical loads.

The energy distribution box described in this document has the disadvantage that it is complex to implement, in particular when the number of inputs and/or outputs is large.

SUMMARY OF THE INVENTION

The present invention has the aim of proposing an energy distribution box for an electrically controlled system of a vehicle which avoids at least certain of the above-mentioned disadvantages and which is malfunction-tolerant.

To this end, the object of the invention is an energy distribution box for an electrically controlled system of a vehicle, the said energy distribution box including:
- a set of inputs intended to be connected to sources for supply of electrical energy,
- a set of outputs intended to be connected to electrical loads of the said system and
- switching means arranged between the said set of inputs and the said set of outputs, the said energy distribution box being able to communicate with a unit for control of the switching means, the said control unit including measurement means for performing measurements of at least one electrical parameter at each input of the said set of inputs and each output of the said set of outputs, the said control unit including decision means able, as a function of the said measurements performed, to detect a malfunction at an input of the said set of inputs or an output of the said set of outputs, the said decision means being able, when a said malfunction has been detected, to operate the said switching means in a degraded mode permitting isolation of the input or the output having the said malfunction, characterised by the fact that the said energy distribution box includes a connection element connected respectively by an input communication line to each input of the said set of inputs, the said connection element being connected respectively by an output communication line to each output of the said set of outputs, a switching means being arranged respectively in each input communication line, a switching means being arranged respectively in each output communication line.

Advantageously, the said set of inputs includes a first input and a second input, a first input supply line extending between the said first input and the said connection element, a second input supply line extending between the said second input and the said connection element, a switching means selectively coupling the said first input supply line and the said second input supply line.

In accordance with one embodiment of the invention, at least one of the said switching means is formed using a transistor.

In accordance with one embodiment of the invention, the said transistor is a transistor with an integrated charge-pump or a transistor with an external redundant charge-pump.

In accordance with one embodiment of the invention, the said transistor is able to be used with its intrinsic diode in case of malfunction of the charge pump supplying the said transistor.

In accordance with one embodiment of the invention, at least one of the said switching means is formed using a relay.

In accordance with one embodiment of the invention, the said control unit is silent in case of malfunction, the said switching means being configured by default so as to supply each outlet of the said set of outlets through at least one input of the said set of inputs.

The invention also has as its object an energy distribution architecture including an energy distribution box, characterised by the fact that the said energy distribution box supplies an electromechanical braking system of the said vehicle with energy, a first input of the said set of inputs being connected to a main source for supply of electrical energy, and a second input of the said set of inputs being connected to a secondary source for supply of electrical energy.

Advantageously, the said electromechanical braking system includes three pedal feel emulators so connected to the said energy distribution box that, in case of malfunction, at least two of the said pedal feel emulators are able to be supplied by the said energy distribution box.

Advantageously, the said electromechanical braking system includes two pedal feel emulators so connected to the said energy distribution box that, in case of malfunction, at least one of the said pedal feel emulators is able to be supplied by the said energy distribution box.

In accordance with one embodiment of the invention, the said set of outputs includes a first output connected to a first electric brake of the said electromechanical braking system and to a first pedal feel emulator of the said electromechanical braking system, the said set of outputs including a second output connected to a second electric brake of the said electromechanical braking system and to a second pedal feel emulator of the said electromechanical braking system, the said set of outputs including a third output connected to a third electric brake of the said electromechanical braking system and to a third pedal feel emulator of the said electromechanical braking system, the said set of outputs including a fourth output connected to a fourth electric brake of the said electromechanical braking system.

In accordance with one embodiment of the invention, the said set of outputs includes a first output connected to a first electric brake of the said electromechanical braking system, to a second electric brake of the said electromechanical braking system, the said second electric brake being arranged diagonally relative to the said first electric brake, and to a first pedal feel emulator of the said electromechanical braking system, the said set of outputs including a second output connected to a third electric brake of the said electromechanical braking system, to a fourth electric brake of the said electromechanical braking system, the said fourth electric brake being arranged diagonally relative to the said third electric brake, and to a second pedal feel emulator of the said electromechanical braking system, the said set of outputs including a third output connected to a third pedal feel emulator of the said electromechanical braking system.

In accordance with one embodiment of the invention, the said set of outputs includes a first output connected to a first electric brake of the said electromechanical braking system, to a second electric brake of the said electromechanical braking system, the said second electric brake being arranged diagonally relative to the said first electric brake, and to a first pedal feel emulator of the said electromechanical braking system, the said set of outputs including a second output connected to the said first electric brake, to the said second electric brake and to a second pedal feel emulator of the said electromechanical braking system, the said set of outputs including a third output connected to a third electric brake of the said electromechanical braking system, to a fourth electric brake of the said electromechanical braking system, the said fourth electric brake being arranged diagonally relative to the said third electric brake, and to a third pedal feel emulator of the said electromechanical braking system, the said set of outputs including a fourth output connected to the said third electric brake and to the said fourth electric brake.

In accordance with one embodiment of the invention, the said set of outputs includes a first output connected to four electric brakes of the said electromechanical braking system and to a first pedal feel emulator of the said electromechanical braking system, the said set of outputs including a second output connected to the said four electric brakes and to a second pedal feel emulator of the said electromechanical braking system, the said set of outputs including a third output connected to a third pedal feel emulator of the said electromechanical braking system.

In accordance with one embodiment of the invention, the said set of outputs includes a first output connected to a first front electric brake of the said electromechanical braking system and to a first pedal feel emulator of the said electromechanical braking system, the said set of outputs including a second output connected to a second front electric brake of the said electromechanical braking system and to a second pedal feel emulator of the said electromechanical braking system, the said set of outputs including a third output connected to two rear electric brakes of the said electromechanical braking system and to a third pedal feel emulator of the said electromechanical braking system.

BRIEF DESCRIPTION OF THE DRAWINGS

The invention will be better understood and other aims, details, characteristics and advantages of it will become more clearly apparent in the course of the following detailed explanatory description of several embodiments of the invention given as purely illustrative and non-limiting examples, with reference to the attached diagrammatic drawings.

In these drawings.

DESCRIPTION OF THE PREFERRED EMBODIMENT

Figure 1:
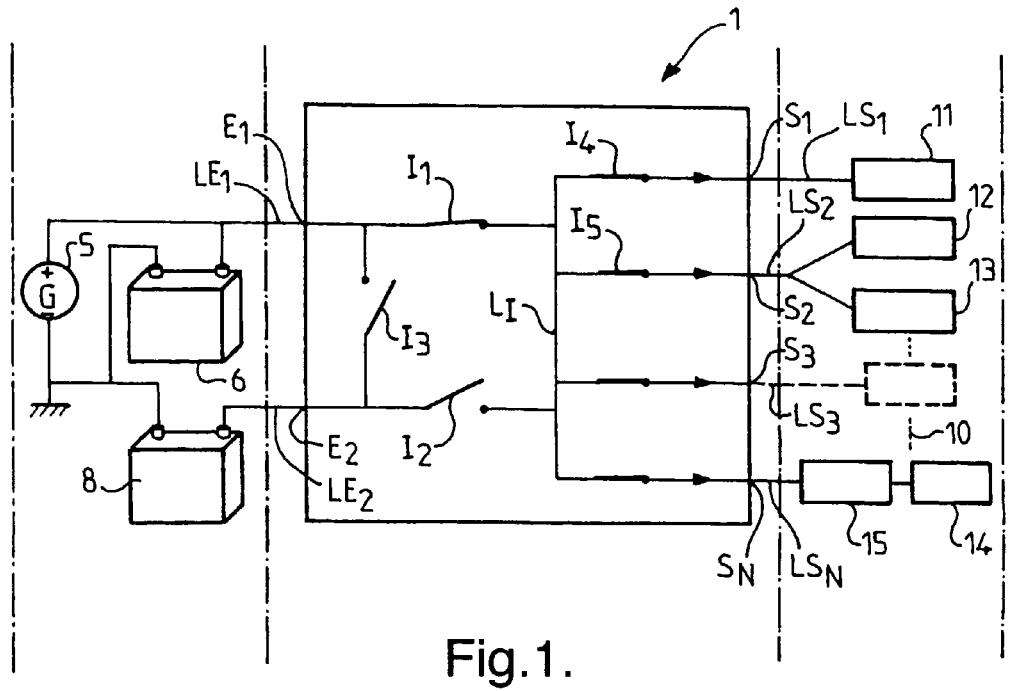
FIG. 1 is a simplified diagrammatic view of an energy distribution box in accordance with a first embodiment of the invention, the energy distribution box being configured in normal mode.

With reference to FIG. 1, an energy distribution box 1 arranged in a vehicle (not shown) includes a first input $E_1$ and a second input $E_2$. The first input $E_1$ is connected, via a first input supply line $L_{E1}$, to a first source supplying electrical energy. The first supply source is for example the usual energy supply network of the vehicle including a 14V generator 5 and a main 12V battery 6.

The second input $E_2$ is connected, via a second input supply line $L_{E2}$, to a second source supplying electrical energy. The second supply source is for example a secondary 12V battery 8. The secondary battery 8 is an emergency battery which supplies energy to the energy distribution box 1 only in case of malfunction of the normal supply network.

As a modification, the second supply source can be an assembly of supercapacitors (not shown), which in particular allows the lifetime of the second supply source to be increased and the management of its load improved.

In the case of using supercapacitors, a current limiting circuit is used to prevent currents of too high a value during the charging of the supercapacitors. The current limiting circuit can for example include a DC-DC chopping convertor, a variable or fixed resistance or a current source.

More generally, the box 1 has a set of inputs comprising a non-limiting number of inputs.

The box 1 includes N outputs $S_1$ to $S_N$, N being a whole number greater than or equal to 1. For the sake of clarity, FIG. 1 shows only four outputs $S_1$, $S_2$, $S_3$ and $S_N$, the presence of a larger number of outputs being symbolised by broken lines 10.

The first output $S_1$ is connected, via a first output supply line $L_{S1}$, to an electrical load 11 of an electrically controlled system. The load 11 is intended to be supplied at a voltage identical to that supplied by the batteries 6, 8.

The second output $S_2$ is connected, via a second output supply line $L_{S2}$, to two electrical loads 12 and 13 of the electrically controlled system. Each of the two loads 12, 13 is intended to be supplied at a voltage identical to that provided by the batteries 6, 8.

The $N^{th}$ output $S_N$ is connected, via an $N^{th}$ output supply line $L_{SN}$, to an electrical load 14 of the electrically controlled system. The load 14 is intended to be supplied at a different voltage from that provided by the batteries 6, 8. A DC-DC convertor 15 is therefore arranged in the output supply line $L_{SN}$ to adapt the voltage of the load 14 to the voltage provided by the batteries 6, 8.

Generally, the box 1 has a set of outputs comprising a non-limiting number of outputs which depends on the number of independent outputs necessary for the target application. An output supply line $L_S$ can supply one or more components. A plurality of DC-DC converters can be used in a plurality of output supply lines $L_S$ to obtain outputs S of different voltages.

As for outputs S, a DC/DC convertor can be used to allow the use of sources supplying electrical energy of different voltages at the inputs E.

Each of the first and second input supply lines $L_{E1}$ and $L_{E2}$ is connected, inside the box 1, to a connection line $L_I$. The connection line $L_I$ is connected to each of the output supply lines $L_S$.

A first circuit-breaker $I_1$ is arranged in the first input supply line $L_{E1}$. The first circuit-breaker $I_1$ permits selective coupling of the first input $E_1$ and the connection line $L_1$, i.e. selective coupling of the first input $E_1$ and the set of outputs S.

A second circuit-breaker $I_2$ is arranged in the second input supply line $L_{E2}$. The second circuit-breaker $I_2$ permits selective coupling of the second input $E_2$ and the connection line $L_1$, i.e. selective coupling of the first input $E_2$ and the set of outputs S.

A third circuit-breaker $I_3$ is arranged between the first input supply line $L_{E1}$ and the second input supply line $L_{E2}$. The third circuit-breaker $I_3$ permits selective coupling of the first input supply line $L_{E1}$ and the second input supply line $L_{E2}$.

A fourth circuit-breaker $I_4$ is arranged in the first output supply line $L_{S1}$. The fourth circuit-breaker $I_4$ permits selective coupling of the connection line $L_I$ and the first output $S_1$, i.e. selective coupling of the set of inputs E and the first output $S_1$.

A fifth circuit-breaker $I_5$ is arranged in the second output supply line $L_{S2}$. The fifth circuit-breaker $I_5$ permits selective coupling of the connection line $L_I$ and the second output $S_2$, i.e. selective coupling of the set of inputs E and the first output $S_2$.

In similar manner, a circuit-breaker I is arranged in each output supply line $L_S$. It will be noted that, N being the number of output supply lines, in this embodiment the box 1 includes N+3 circuit-breakers.

The input supply lines $L_E$ and the output supply lines $L_S$ can each be disconnected from the connection line $L_I$ by opening the corresponding circuit-breaker I.

The output supply lines $L_S$ are thus independent of each other. Each output supply line $L_S$ can be disconnected by opening the corresponding circuit-breaker I, this not preventing supply of the other output supply lines $L_S$ by the input supply lines $L_E$.

This arrangement allows a box 1 having a large number of inputs E and outputs S to be constructed very simply.

The circuit-breakers I are for example formed by transistors of MOSFET type, supplied by a charge pump.

Two redundant charge pumps can be used to allow operation of the transistors in case of malfunction of one charge pump.

As a modification, the transistors include an integrated charge pump.

Figure 11:
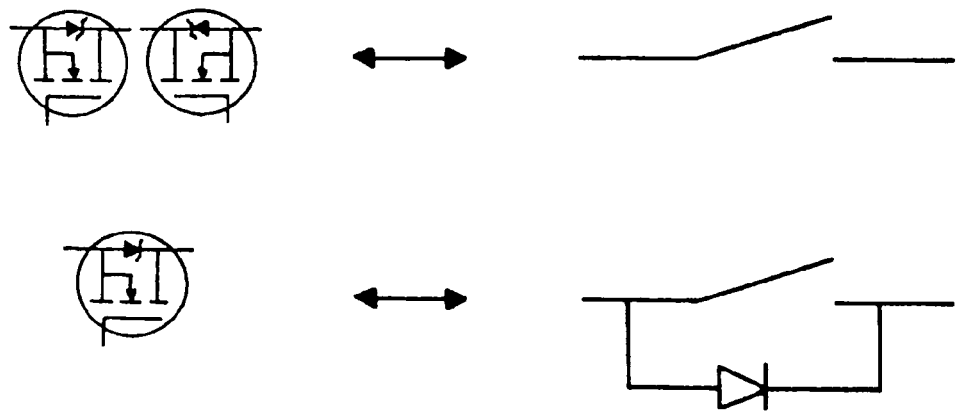
FIG. 11 is a simplified electrical diagram diagrammatically showing a transistor of MOSFET type and its intrinsic diode.

As a modification, the transistors are configured to be able to allow passage of current due to their intrinsic diode in case of malfunction of their charge pump. FIG. 11 shows the electrical equivalent of a transistor of MOSFET type in case of supply malfunction of the charge pump.

Figure 12:
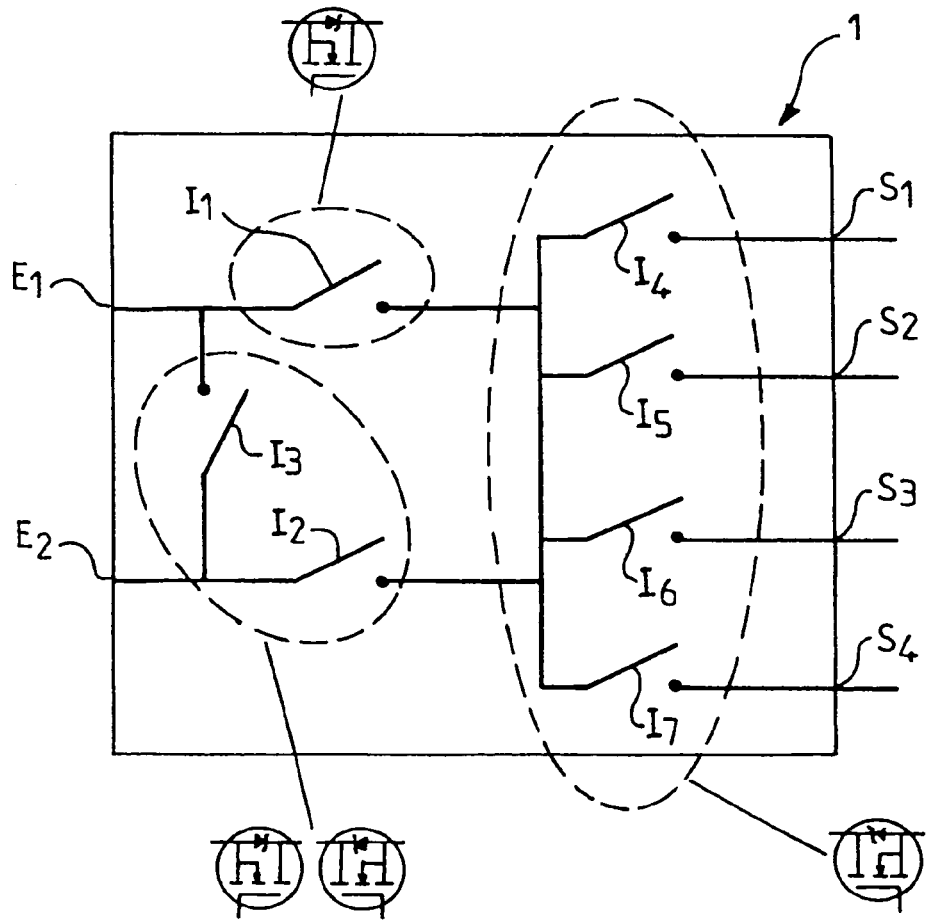
FIG. 12 is a simplified diagrammatic view of a modified embodiment of the energy distribution box using transistors of MOSFET type.

FIG. 12 shows a modified embodiment of the energy distribution box. In this modification, the circuit-breakers $I_1$, $I_2$ and $I_3$ are formed by transistors of MOSFET type supplied by the same charge pump. The circuit-breakers $I_4$, $I_5$, $I_6$ and $I_7$ are formed by transistors of MOSFET type having their own charge pump. In case of malfunction of the charge pump supplying circuit-breakers $I_1$, $I_2$ and $I_3$, current can flow due to the intrinsic diode of the transistor of the circuit-breaker $I_1$.

Other modifications are possible. For example the circuit-breakers I can be formed by other semiconductor based switching devices (transistor of IGBT type, thyristor, diode), or by relays.

Opening and closing of the circuit-breakers I is controlled by a control unit (not shown). The control unit includes, or is connected to, measurement means (not shown) able to perform measurements of current and voltage at each input E and each output S and at internal components of the box 1. Additional external sensors (not shown), for example temperature sensors, can also be connected to the control unit, via analogue inputs or communication buses.

The control unit includes decision means (not shown). The decision means are formed for example from micro-controllers or programmable integrated circuits of FPGA (Field Programmable Gate Array) or ASIC (Application Specific Integrated Circuit) type.

The decision means have a redundant structure to be malfunction-tolerant. Redundancy at the control unit is of order 2. In case of malfunction of the control unit, the latter is silent, the silence of the control unit being a steady state. In case of malfunction of the control unit, the supply of outputs S is guaranteed due to the default configuration of the circuit-breakers I, as will be described in detail below. For example, the decision means can be formed by an asymmetrical micro-controller system including a main micro-controller and a cheap monitoring controller. As a modification, the decision means can be formed from a symmetrical micro-controller system including two main micro-controllers. As a modification, the decision means can be formed from a single micro-controller having a dual core architecture. As a modification, the decision means can be formed from a micro-controller supervised by an ASIC or FPGA circuit. As a modification, the decision means can be formed from two ASIC or FPGA circuits. As a modification, the decision means can be formed from a single micro-controller including internally a main core and a co-processor, coupled to a very reliable external equipment system controlling its operation, also called a "guard dog".

For safety reasons, all the switches I are closed by default, i.e. in the absence of control of the control unit, except the circuit-breakers $I_2$ and $I_3$. This allows the outputs S to be supplied by the source 6 by default. In particular in the absence of control of the control unit on malfunction of this unit, the outputs S are supplied by 6. This configuration permits use of a control unit which is silent on malfunction (order 2 redundancy), and freedom from triple redundancy at this unit.

Control algorithms are stored in the control unit for energy management.

The control unit can be internal to the energy distribution box 1 or made in the form of an external unit connected to the box 1, for example by use of a communication bus.

The energy distribution box 1 is so arranged in the vehicle as to avoid risks of damage caused, for example, by a shock. The box 1 is for example arranged inside the driving cab or in the boot.

The operation of the energy distribution box 1 will now be described.

The main function of the box 1 is to supply the electrical loads 11, 12, 13, 14 with energy from supply sources 6, 8.

For this purpose, the control algorithms include a malfunction management algorithm. The malfunction management algorithm permits determination, from measurements provided by the measurement means, of the presence of a malfunction at a point in the supply network. The supply network is defined by the set of supply lines $L_E$, $L_S$ extending between the batteries 6, 8 and the loads 11, 12, 13, 14.

Figure 4:
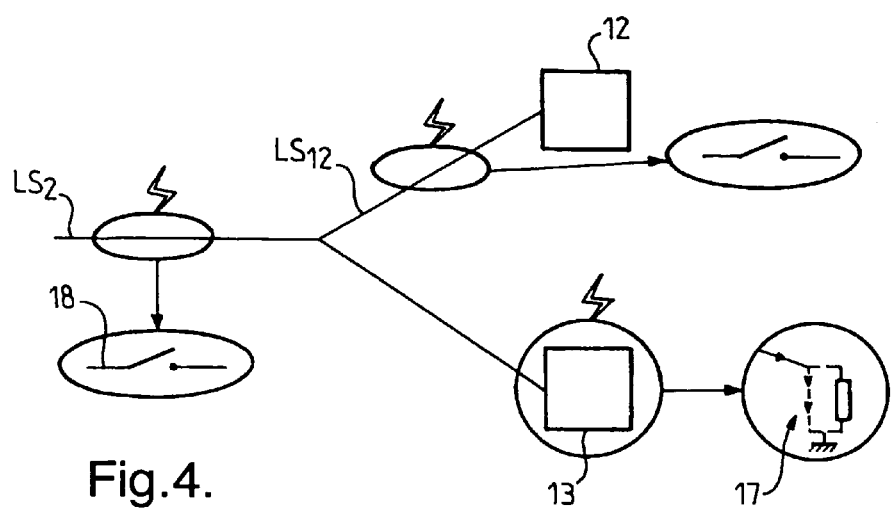
FIG. 4 is a simplified electrical diagram showing diagrammatically different malfunctions which can occur in an output supply line connecting an output of the energy distribution box and two electrical loads.

FIG. 4 shows examples of malfunctions which can occur in the second output supply line $L_{S2}$. A short-circuit at the load 13 is equivalent to a connection of the supply line to earth, such as that shown diagrammatically by the electrical circuit 17.

An open-circuit in the supply line $L_{S2}$ is equivalent to the presence of an open switch 18 in the supply line $L_{S2}$. In this case, the loads 12 and 13 are disconnected. When the open-circuit is in a sub-system, i.e. for example in the sub-supply line $L_{S12}$ connecting the supply line $L_{S2}$ and the load 12, only the load 12 is disconnected.

More generally, a malfunction can be due to an open-circuit or a short-circuit in an input E or an output S. A malfunction can also be due to an under-voltage, to an over-voltage, to an over-current or to an under-current, at an input E or an output S. A malfunction can also be due to malfunction of an internal component of the box 1.

When the control unit detects a malfunction, for example by comparing the measurements provided by the measurement means with pre-defined values corresponding to normal operation, the control unit causes isolation of the malfunction and determines a malfunction management scheme, or degraded mode, permitting optimisation of the availability of output supply lines $L_S$.

For example in case of an open-circuit in the first input supply line $L_{E1}$ (FIG. 2), the control unit causes the opening of the first circuit-breaker $I_1$, to isolate the malfunction. It will be noted that the third circuit-breaker $I_3$ is already open in the normal mode shown in FIG. 1. In the contrary case, the control unit also causes opening of the circuit-breaker $I_3$. The control unit causes closure of the second circuit-breaker $I_2$, to allow supply of the loads 11, 12, 13 and 14 from the secondary battery 8. In this degraded mode, all the output supply lines $L_S$ are available.

Figure 3:
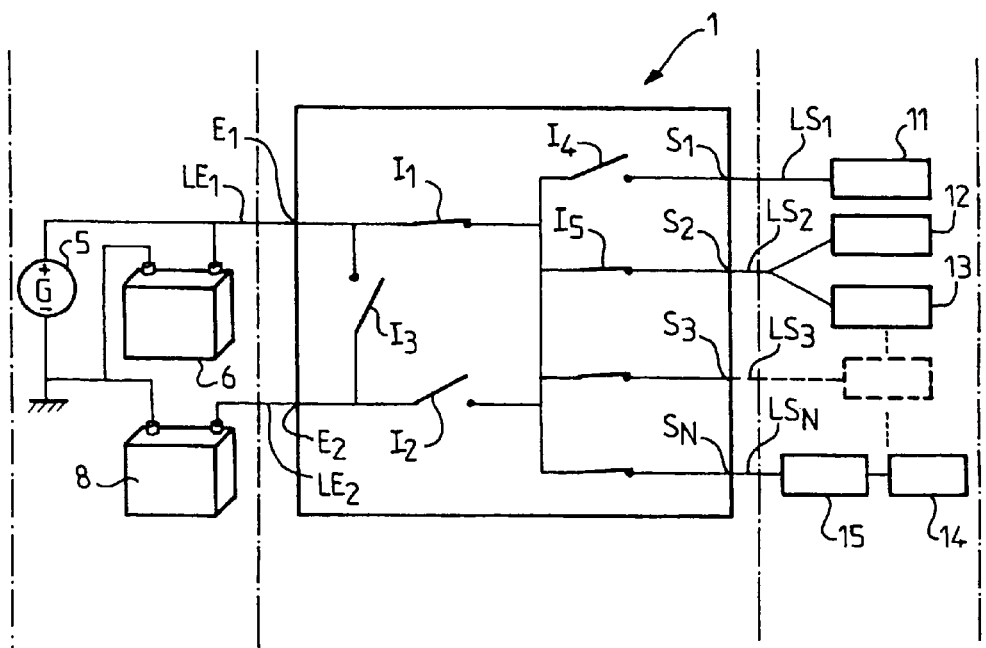
FIG. 3 is a view similar to FIG. 1 showing the energy distribution box configured in a degraded mode following detection of a short-circuit in an electrical load connected to the energy distribution box.

FIG. 3 shows the case of a short-circuit detected in the output $S_1$. In this case, the control unit causes opening of the fourth circuit-breaker $I_4$ to isolate the malfunction. The state of the other circuit-breakers I is not modified relative to the normal mode. In this degraded mode, only one output supply line, i.e. the line $L_{S1}$, is not available. The other output supply lines $L_S$ function normally.

Thus, in case of a malfunction, all the output supply lines $L_S$ are available, or, in the worst case, N−1 output supply lines $L_S$ are available.

Figure 2:
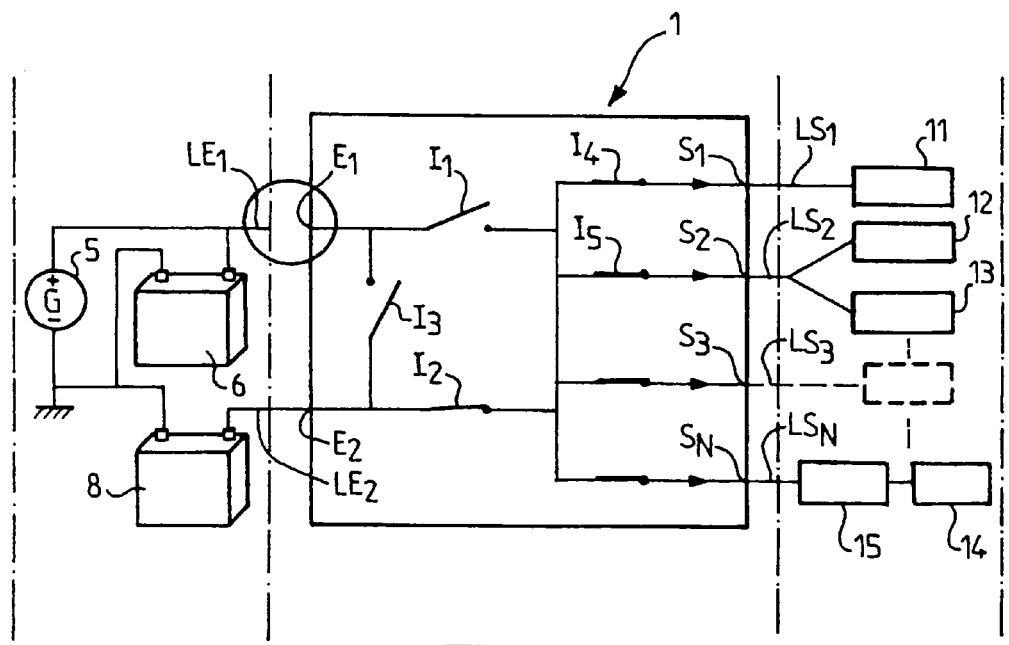
FIG. 2 is a view similar to FIG. 1 showing the energy distribution box configured in a degraded mode following detection of an open-circuit in the connection between the energy distribution box and a main battery.

When the end of a malfunction is detected, for example, in the case shown in FIG. 2, when the circuit is no longer open at the first input $E_1$, the control unit causes return to the normal mode. In the example, the control unit causes the closure of the first circuit-breaker $I_1$ and opening of the second circuit-breaker $I_2$. This allows the degraded mode to be retained only as long as necessary.

The control unit also has the function of controlling the batteries 6, 8, in a manner which is itself known, to guarantee the availability of a specific energy reserve for critical components.

The control unit also has the function of managing recharging of the batteries 6, 8. For this purpose, the control algorithms include an algorithm for management of the energy sources. This algorithm permits selection of the most reliable source for the supply. When the most reliable energy source has been selected, the control unit connects the set of outputs S to this source, selectively using the first and second circuit-breakers $I_1$ and $I_2$.

With reference to FIGS. 5 to 10, several examples of energy distribution architectures will now be described, in which the box 1 which is as described above, supplies an electromechanical braking system.

The braking system includes a right rear electric brake 20 associated with the right rear wheel of the vehicle, a left rear electric brake 21 associated with the left rear wheel of the vehicle, a left front electric brake 22 associated with the left front wheel of the vehicle and a right front electric brake 23 associated with the right front wheel of the vehicle. Each electric brake 20 to 23 includes a brake calliper, in known manner. The brake callipers are for example callipers operating at a voltage of 12V. In this case, the voltage of the callipers is suited to the voltage of the batteries 6, 8 and it is not necessary to use DC-DC converters. The braking system includes a set of sensors 24 permitting determination of a command from the driver of the vehicle. The set of sensors includes for example three pedal feel emulators 25, 26 and 27 associated with the brake pedal of the vehicle. A modification with only two pedal feel emulators 25 and 26 is also possible.

Figure 5:
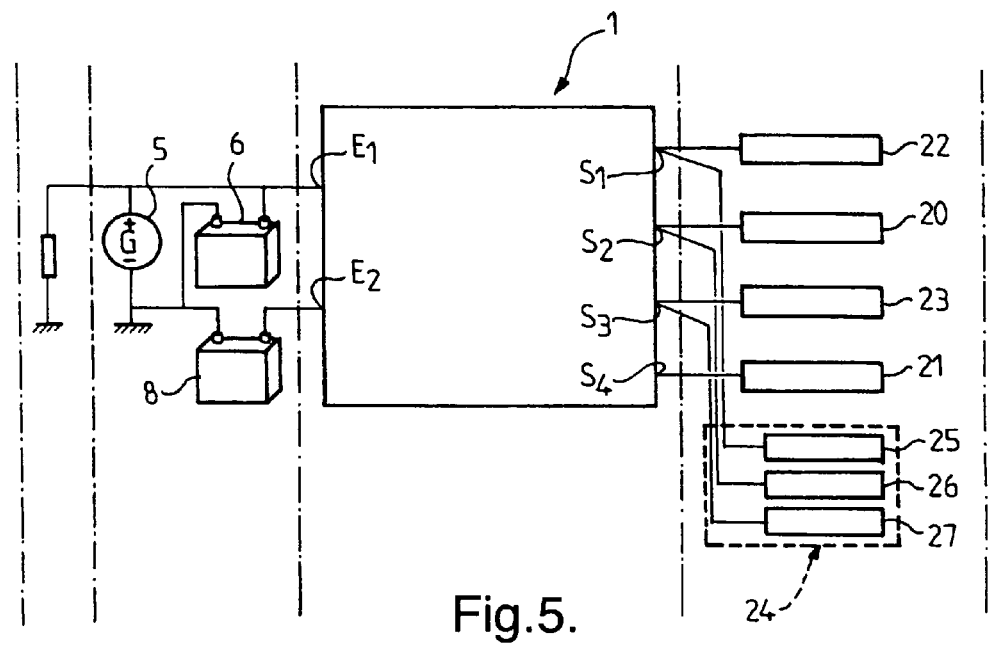
FIG. 5 is a simplified diagrammatic view showing a first example of energy distribution architecture in which the energy distribution box of FIG. 1 is supplying energy to an electromechanical braking system.

FIG. 5 shows a first example of architecture. For the sake of clarity, the inside of the box 1 has not been shown.

In this example, the box 1 includes four outputs $S_1$, $S_2$, $S_3$ and $S_4$, i.e. N=4. The output $S_1$ is connected to the left front brake 22 and to the pedal emulator 25. The output $S_2$ is connected to the right rear brake 20 and to the pedal emulator 26. The output $S_3$ is connected to the right front brake 23 and to the pedal emulator 27. The output $S_4$ is connected to the left rear brake 21.

In this example, the brakes 20 to 22 are connected independently of each other. The emulators 25, 26 and 27 use the same outputs S as the brakes 22, 20 and 23, respectively. It will be noted that additional outputs could be provided to separate the emulators of the brake pedal.

Figure 6:
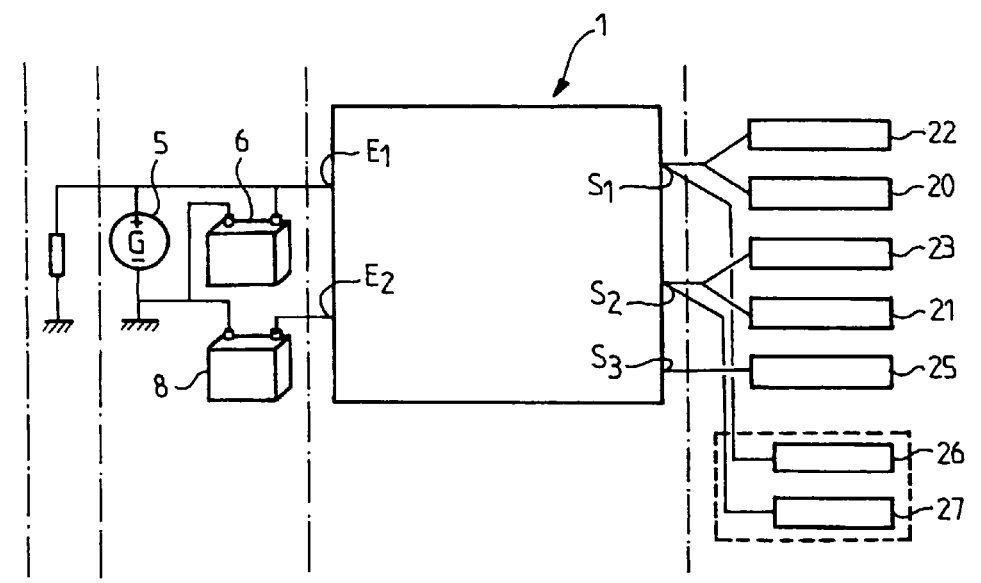
FIG. 6 is a view similar to FIG. 5 showing a second example of energy distribution architecture.

FIG. 6 shows a second example of architecture. In this example, the box 1 includes three outputs $S_1$, $S_2$ and $S_3$, i.e. N=3.

The output $S_1$ is connected to the left front brake 22, to the right rear brake 20 and to the emulator 26. The output $S_2$ is connected to the right front brake 23, to the left rear brake 21 and to the emulator 27. The output $S_3$ is connected to the emulator 25. It will be noted that the brakes 20 to 23 are associated diagonally in pairs, i.e. the left front brake 22 is associated with the right rear brake 20 and the left rear brake 21 is associated with the right front brake 21. This permits braking on a diagonal, in case of malfunction of an output, which ensures the stability of the vehicle.

Figure 7:
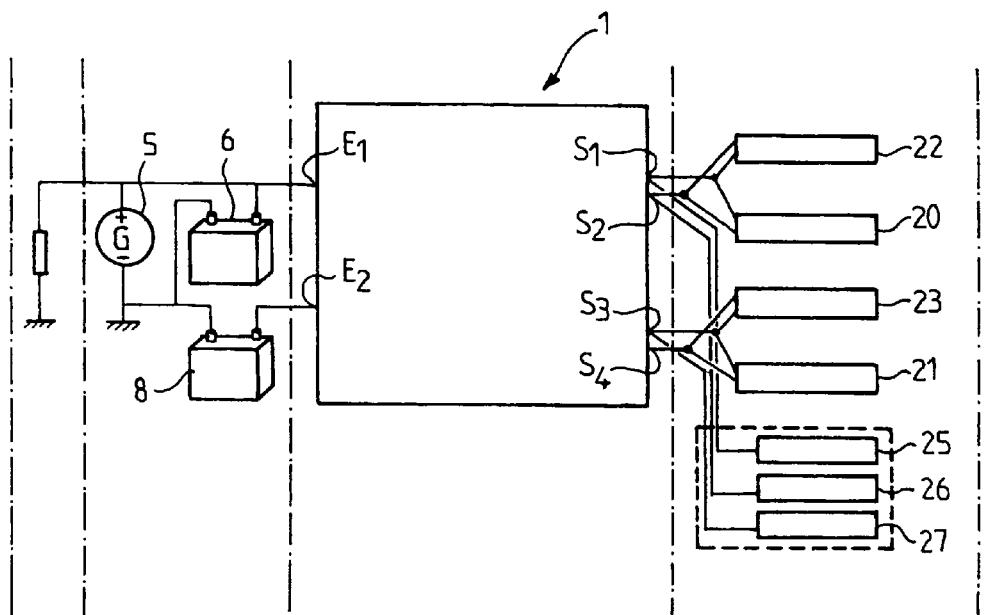
FIG. 7 is a view similar to FIG. 5 showing a third example of energy distribution architecture.

FIG. 7 shows a third example of architecture.

In this example, the box 1 includes four outputs $S_1$, $S_2$, $S_3$ and $S_4$, i.e. N=4. The output $S_1$ is connected to the left front brake 22, to the right rear brake 20 and to the emulator 25. The output $S_2$ is connected to the left front brake 22, to the right rear brake 20 and to the emulator 26.

The output $S_3$ is connected to the right front brake 23, to the left rear brake 21 and to the emulator 27. The output $S_4$ is connected to the right front brake 23 and to the left rear brake 21.

In this example, the brakes are coupled in diagonal pairs and are supplied redundantly.

Figure 8:
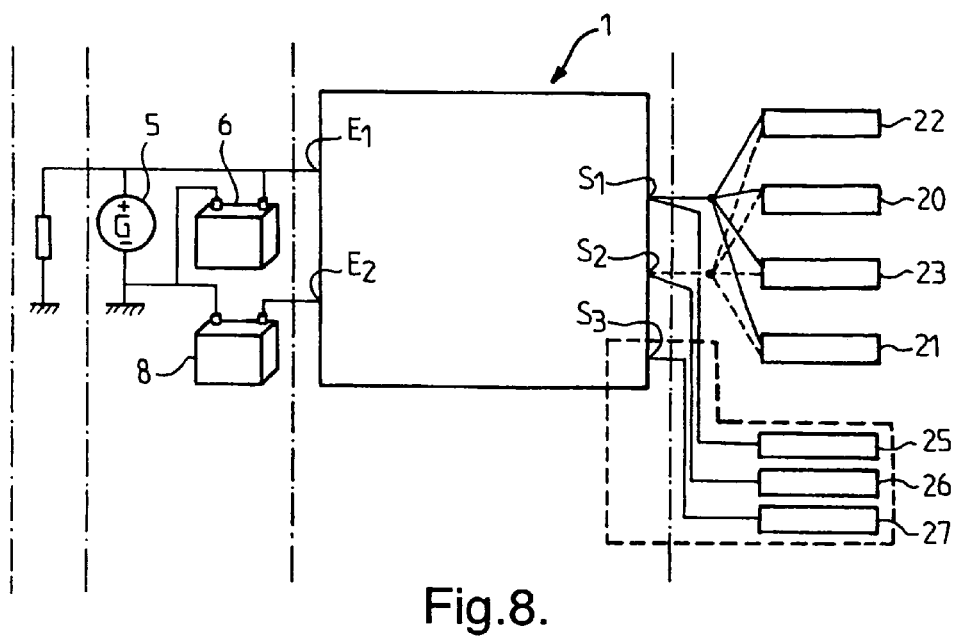
FIG. 8 is a view similar to FIG. 5 showing a fourth example of energy distribution architecture.

FIG. 8 shows a fourth example of architecture.

In this example, the box 1 includes three outputs $S_1$, $S_2$ and $S_3$, i.e. N=3. The output $S_1$ is connected to each of the brakes 20 to 23 and to the emulator 25. The output $S_2$ is connected to each of the brakes 20 to 23 and to the emulator 26. The output $S_3$ is connected to the emulator 27.

Figure 9:
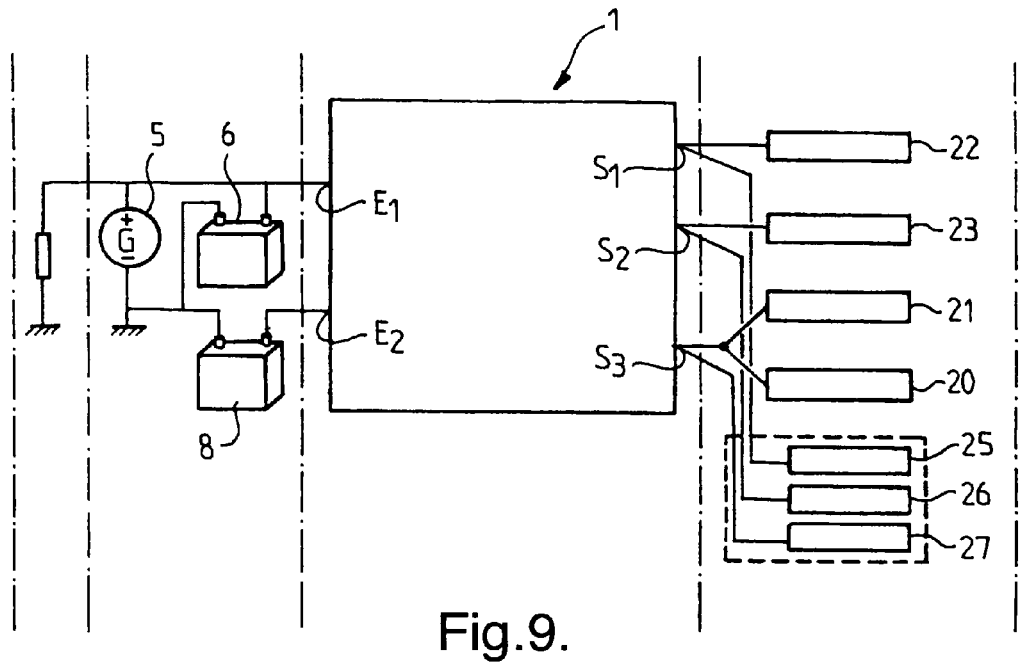
FIG. 9 is a view similar to FIG. 5 showing a fifth example of energy distribution architecture.

FIG. 9 shows a fifth example of architecture.

In this example, the box 1 includes three outputs $S_1$, $S_2$ and $S_3$, i.e. N=3. The output $S_1$ is connected to the left front brake 22 and to the emulator 25. The output $S_2$ is connected to the right front brake 23 and to the emulator 26. The output $S_3$ is connected to the left rear brake 21, to the right rear brake 20 and to the emulator 27.

It will be noted that, in this example, the rear brakes are coupled together, the front brakes being independent of each other and of the rear brakes.

The general operation of the first to fifth examples of architecture is similar to what has been described above.

In normal mode, i.e. in the absence of detection of malfunction, the main battery 6 is used to supply the electric brakes 20 to 23 and the emulators 25, 26 and 27.

When the engine of the vehicle is running, the generator 5 charges the main battery 6 and the secondary battery 8 while the secondary battery 8 is not completely recharged.

In normal mode, all the circuit-breakers I are closed except the third circuit-breaker $I_3$, i.e. the circuit-breaker connecting the first line $L_{E1}$ and the second line $L_{E2}$ (FIG. 1), and the second circuit-breaker $I_2$, which are open.

When a malfunction is detected, the box 1 ensures maximum availability of the braking system.

For example, in the case of a problem with the connection between the box 1 and the main battery 6 the control unit causes opening of the first circuit-breaker $I_1$ and closure of the second circuit-breaker $I_2$. In other words, the control unit causes the use of the secondary battery 8 to supply the brakes 20 to 23.

In case of a short circuit at an output S, the box 1 isolates the output in question, to isolate the malfunction and ensure availability of energy. The circuit-breakers I of the output supply lines $L_S$ are thus used as "intelligent fuses" and are open when a malfunction is detected at their associated output.

Tables 1 to 5, which are associated with examples of architecture 1 to 5 respectively, show the architecture performances in the degraded modes.

The different architectures result from different compromises between the number of outputs, and therefore the cost, and the braking performances in the degraded modes, i.e. in the case of malfunction. All the architectures proposed are malfunction-tolerant and meet safety requirements.

It will however be noted that the fourth architecture requires the use of specific brake callipers to prevent a risk of a general malfunction in case of short-circuit in one calliper.

Figure 10:
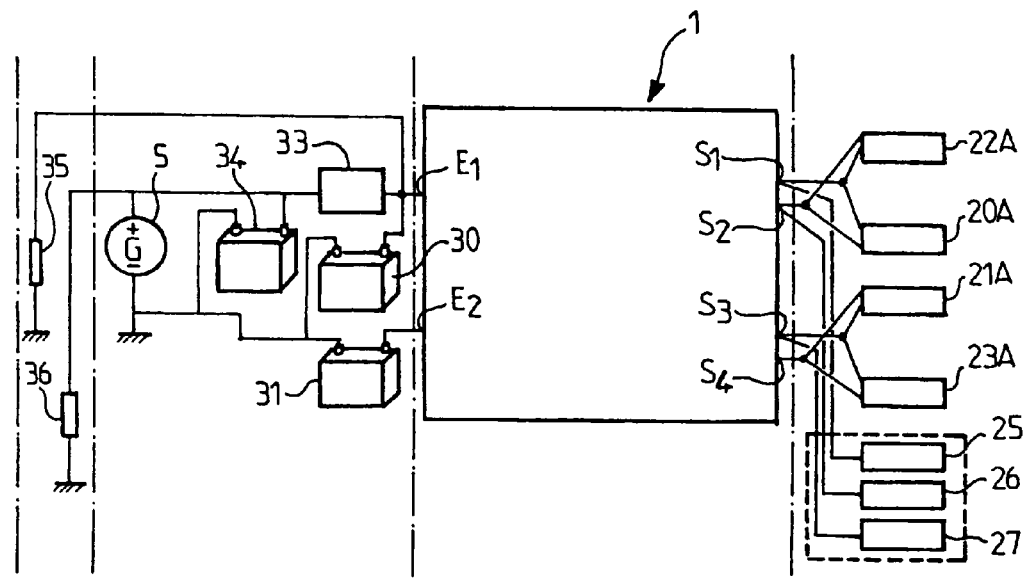
FIG. 10 is a view similar to FIG. 5 showing a sixth example of energy distribution architecture.

FIG. 10 shows a sixth example of architecture using brake callipers 20A to 23A operating at a voltage of 36V. In this case, the inputs $E_1$ and $E_2$ are each connected to a 36V battery 30 and 31. The 14V generator 5 and a 12V battery 34 are connected to the input $E_1$ using a 12V/42V DC-DC convertor 32. Non-critical loads, i.e. loads which if their operation were stopped would not cause a safety problem for the vehicle, can be connected directly to the supply sources. For example, a load 35, operating at a voltage of 42V is connected directly to the output of the convertor 33. Similarly, a load 36, operating at a voltage of 12V, is connected directly to the output of the battery 34. The operation of this example of architecture is similar to what has been described above.

Although the invention has been described in relation to several particular embodiments, it is quite obvious that it is in no way limited to them and that it includes all the technical equivalents of the means described and their combinations if these fall within the scope of the invention.

TABLE 1 first example of architecture

| Malfunction detected | Degraded mode/availability | Safety |
|---|---|---|
| Short-circuit at a calliper | Braking at 3 wheels | No general malfunction |
| Open-circuit at a calliper | Braking at 3 wheels | No general malfunction |
| Open-circuit in an output supply line | Braking at 3 wheels | No general malfunction |

TABLE 2 second example of architecture

| Malfunction detected | Degraded mode/availability | Safety |
|---|---|---|
| Short-circuit at a calliper | Braking on a diagonal | No general malfunction |
| Open-circuit at a calliper | Braking at 3 wheels | No general malfunction |
| Open-circuit in an output supply line | Braking on a diagonal OR normal braking | No general malfunction |

TABLE 3 third example of architecture

| Malfunction detected | Degraded mode/availability | Safety |
|---|---|---|
| Short-circuit at a calliper | Braking on a diagonal OR normal braking | No general malfunction |
| Open-circuit at a calliper | Normal braking | No general malfunction |
| Open-circuit in an output supply line | Normal braking | No general malfunction |

TABLE 4 fourth example of architecture

| Malfunction detected | Degraded mode/availability | Safety |
|---|---|---|
| Short-circuit at a calliper | No braking OR normal braking | Risk of general malfunction (specific callipers must be used) |
| Open-circuit at a calliper | Normal braking | No general malfunction |
| Open-circuit in an output supply line | Normal braking | No general malfunction |

TABLE 5 fifth example of architecture

| Malfunction detected | Degraded mode/availability | Safety |
|---|---|---|
| Short-circuit at a calliper | Front braking OR braking at 3 wheels (1 front wheel and 2 rear wheels) | No general malfunction |
| Open-circuit at a calliper | Braking at 3 wheels | No general malfunction |
| Open-circuit in an output supply line | Front braking OR braking at 3 wheels (1 front wheel and 2 rear wheels) | No general malfunction |

The invention claimed is:

1. An energy distribution box for supplying energy to an electromechanical braking system of a vehicle, the energy distribution box including:
   a first input being connected to a main source for supply of electrical energy;
   a second input being connected to a secondary source for supply of electrical energy;
   a plurality of outputs connected to a first and second and third and fourth electric brakes and at least two pedal feel emulators;
   a connection line connected respectively by an input supply line to each of said inputs and an output supply line to each of said outputs;
   a switching means being arranged respectively in each of said input supply lines for selectively and independently coupling each of said inputs with said connection line;
   a switching means being arranged respectively in each of said output supply lines for selectively and independently coupling each of said outputs with said connection line; and
   each of said output supply lines being disposed independent of each other and said at least two pedal feel emulators disposed separately on independent output supply lines for ensuring that in case of malfunction of one of said pedal feel emulators that at least one of said pedal feel emulators is supplied with electrical energy from said energy distribution box.

2. An energy distribution box as described in claim 1, wherein said input supply lines include a first input supply line extending between the said first input and the said connection element, and a second input supply line extending between the said second input and the said connection element and a switching means disposed between said first input supply line and said second input supply line for providing selective coupling of the said first input supply line and the said second input supply line.

3. An energy distribution box as described in claim 1 wherein at least one of the said switching means is formed using a transistor.

4. An energy distribution box as described in claim 3 wherein said transistor is a transistor with an integrated charge pump or a transistor with an external and redundant charge pump.

5. An energy distribution box as described in claim 3 wherein said transistor is able to be used with its intrinsic diode in case of malfunction of the charge pump supplying the said transistor.

6. An energy distribution box as described in claim 1 wherein at least one of the said switching means is formed by means of a relay.

7. An energy distribution box as described in claim 1 wherein said at least two pedal feel emulators includes three pedal feel emulators disposed separately on independent output supply lines for ensuring that in case of malfunction of one of said pedal feel emulators that at least two of the said pedal feel emulators supplied with electrical energy from said energy distribution box.

8. An energy distribution box as described in claim 7 wherein said plurality of outputs includes a first output connected to said first electric brake and to said first pedal feel emulator and a second output connected to said second electric brake and to said second pedal feel emulator and a third output connected to said third electric brake and to said third pedal feel emulator and a fourth output connected to said fourth electric brake.

9. An energy distribution box as described in claim 7 wherein said plurality of outputs includes a first output connected to said first electric brake and to said second brake being arranged diagonally relative to the said first electric brake and to said first pedal feel emulator and a second output connected to said third electric brake and to said fourth electric brake being arranged diagonally relative to the said third electric brake, and to said second pedal feel emulator and a third output connected to said third pedal feel emulator.

10. An energy distribution box as described in claim 7 wherein said plurality of outputs includes a first output connected to said first electric brake and to said second electric brake being arranged diagonally relative to the said first electric brake and to said first pedal feel emulator and a second output connected to said first electric brake and to said second electric brake and to said second pedal feel emulator and a third output connected to said third electric brake and to said fourth electric brake being arranged diagonally relative to said third electric brake and to said third pedal feel emulator and a fourth output connected to said third electric brake and to said fourth electric brake.

11. An energy distribution box as described in claim 7 said plurality of outputs includes a first output connected to each of said electric brakes and to said first pedal feel emulator and a second output connected to each of said electric brakes and to said second pedal feel emulator and a third output connected to said third pedal feel emulator.

12. An energy distribution box as described in claim 7 wherein said plurality of outputs includes a first output connected to a first front electric brake and to said first pedal feel emulator and a second output connected to a second front electric brake and to said second pedal feel emulator and a third output connected to two rear electric brakes and to said third pedal feel emulator.

* * * * *

UNITED STATES PATENT AND TRADEMARK OFFICE
CERTIFICATE OF CORRECTION

PATENT NO. : 7,851,939 B2  Page 1 of 1
APPLICATION NO. : 11/820843
DATED : December 14, 2010
INVENTOR(S) : Paul Degoul and Jean-Francois M Larroux It is certified that error appears in the above-identified patent and that said Letters Patent is hereby corrected as shown below:

Column 12, Line 20, Claim 7: "feel emulators supplied" should read --feel emulators are supplied--

Column 12, Line 51, Claim 11: "described in claim 7" should read --described in claim 7 wherein--

Signed and Sealed this
Twenty-fourth Day of April, 2012

David J. Kappos
*Director of the United States Patent and Trademark Office*